United States Patent [19]

Kojima et al.

[11] Patent Number: 4,625,840
[45] Date of Patent: Dec. 2, 1986

[54] HYDRAULIC CONTROL UNIT FOR AUTOMOTIVE TRANSMISSIONS

[75] Inventors: Yutaka Kojima, Higashimatsuyama; Hisao Ishida, Tokyo, both of Japan

[73] Assignees: Diesel Kiki Co., Ltd.; Isuzu Motors Co., Ltd., both of Tokyo, Japan

[21] Appl. No.: 640,316

[22] Filed: Aug. 13, 1984

[30] Foreign Application Priority Data

Aug. 19, 1983 [JP] Japan ............................ 58-128077[U]
Aug. 19, 1983 [JP] Japan ............................ 58-128078[U]

[51] Int. Cl.$^4$ ............................................ B60K 41/22
[52] U.S. Cl. ................................. 192/3.58; 192/3.61
[58] Field of Search ................... 192/3.58, 3.61, 3.62, 192/3.63; 74/364

[56] References Cited

U.S. PATENT DOCUMENTS

| | | | |
|---|---|---|---|
| 2,992,565 | 7/1961 | Hansen et al. ................ | 192/3.58 X |
| 3,298,483 | 1/1967 | Morrison ...................... | 192/3.58 |
| 3,478,851 | 11/1969 | Smyth et al. .................. | 192/3.55 |
| 4,516,669 | 5/1985 | Boström ........................ | 192/3.58 |

*Primary Examiner*—Rodney H. Bonck
*Assistant Examiner*—Richard M. Lorence
*Attorney, Agent, or Firm*—Frishauf, Holtz, Goodman & Woodward

[57] ABSTRACT

A hydraulic control unit for an automotive transmission has a change gear operating mechanism and a clutch operating mechanism. All component parts of the control unit are incorporated into one body. These include a first hydraulic actuator for gear shifting and gear selection of the speed change gear, solenoid valves for controlling the first hydraulic actuator, position sensors for sensing positions of the first hydraulic actuator indicative of the selected gear position and shifted gear position of the speed change gear, a second hydraulic actuator for engagement and disengagement of the clutch, solenoid valves for controlling the second hydraulic actuator, and a position sensor for sensing the position of the second hydraulic actuator indicative of engagement and disengagement of the clutch. An air breather provided on the control unit housing on the side of the speed change gear communicates with an air chamber of the second hydraulic actuator through a passage formed within the control unit housing, to also serve as an air breather for the same chamber.

8 Claims, 5 Drawing Figures

HYDRAULIC CONTROL UNIT FOR AUTOMOTIVE TRANSMISSIONS

BACKGROUND OF THE INVENTION

This invention relates to a hydraulic control unit for controlling a speed change gear and a clutch which form an automotive transmission.

Transmissions for automotive vehicles include a manually operated type which can also be used as an automatic type with addition of a control unit which automatically controls the transmission. Such control unit generally has many component parts including a hydraulic actuator for effecting gear selection and gear shifting of the speed change gear in place of the manually operating lever of the speed change gear, a solenoid valve for controlling the hydraulic actuator, and a sensor means for sensing the selected position and shifted position of the speed change gear. A transmission with such a control unit has many connection pipes connecting component parts of the oil hydraulic circuit, e.g. the hydraulic actuator and the solenoid valve.

Furthermore, the control unit also includes a hydraulic actuator for driving the clutch of the automotive vehicle, which is incorporated in the same housing that accommodates the first-mentioned hydraulic actuator for selecting and shifting operations of the speed change gear. Therefore, the number of component parts of the control unit is large with the addition of a control or solenoid valve for controlling the hydraulic actuator for the clutch, a sensor for sensing the clutch position, etc., making the piping of the oil hydraulic circuit very complicated. This increases the assembly time required for manufacturing the transmission and degrades its operational reliability.

The aforementioned hydraulic actuator for the clutch includes a piston-cylinder type comprising a rod drivingly connected at one end to the clutch, a piston secured to the other end of the rod, and a cylinder in which the piston is slidably received and which cooperates with the piston to define a hydraulic oil chamber at one side of the piston and an air chamber at the opposite side thereof. In this type hydraulic actuator, the air chamber communicates with the atmosphere through an air breather opening in the air chamber at an upper location thereof. However, during movement of the piston within the cylinder barrel, hydraulic operating oil leaks bit by bit from the hydraulic oil chamber to the air chamber through the clearance between the cylinder and the piston and stays in the air chamber. This adversely affects the operation of a position sensor provided on the side of the air chamber, as well as the operation of the piston-cylinder type actuator. Moreover, as the air chamber contracts with movement of the piston to compress the air therein, operating oil staying in the air chamber is blown out of the air chamber through the air breather and scattered, thereby contaminating the peripheral parts.

The speed change gear is provided with an air breather opening for communicating the interior of the speed change gear casing with the atmosphere. The provision of two air breathers, however, is not only unfavorable costwise and functionally, but also reduces the efficiency of assembly and complicates the maintenance operation.

SUMMARY OF THE INVENTION

It is an object of the invention to provide a hydraulic control unit for an automotive transmission in which all the main component parts of the change gear operating mechanism and the clutch operating mechanism are incorporated in a single housing in one body so as to avoid complicated piping and reduce the number of connection pipes used, thereby providing improved operational reliability and enhanced efficiency of assembly.

It is another object of the invention to provide a hydraulic control unit for an automotive transmission which employs a single air breather and prevents storage of operating oil in the air chamber of the hydraulic actuator of the clutch operating mechanism.

The present invention provides a hydraulic control unit adapted for use in an automotive transmission having a speed change gear and a clutch, and including a change gear operating mechanism for hydraulically operating the speed change gear, and a clutch operating mechanism for hydraulically operating the clutch, wherein the change gear operating mechanism and the clutch operating mechanism are both incorporated in a single housing.

The hydraulic control unit according to the invention is characterized as follows: The aforesaid change gear operating mechanism comprises a first hydraulic actuator for effecting gear selection of the speed change gear and gear shifting thereof, a first solenoid valve for controlling the first hydraulic actuator, first and second position sensors for sensing positions of the first hydraulic actuator indicative of a selected gear position of the speed change gear and a shifted gear position of same, respectively, while the aforesaid clutch operating mechanism comprises a second hydraulic actuator for effecting engagement and disengagement of the clutch, a second solenoid valve for controlling the second hydraulic actuator, and a third position sensor for sensing a position of the second hydraulic actuator indicative of engagement and disengagement of the clutch. The first and second hydraulic actuators, the first and second solenoid valves, and the first, second and third position sensors are all incorporated in one body in the housing of the control unit.

The above and other objects, features and advantages of the invention will be more apparent from the ensuing detailed description taken in conjunction with the accompanying drawings.

DETAILED DESCRIPTION

Figure 1:
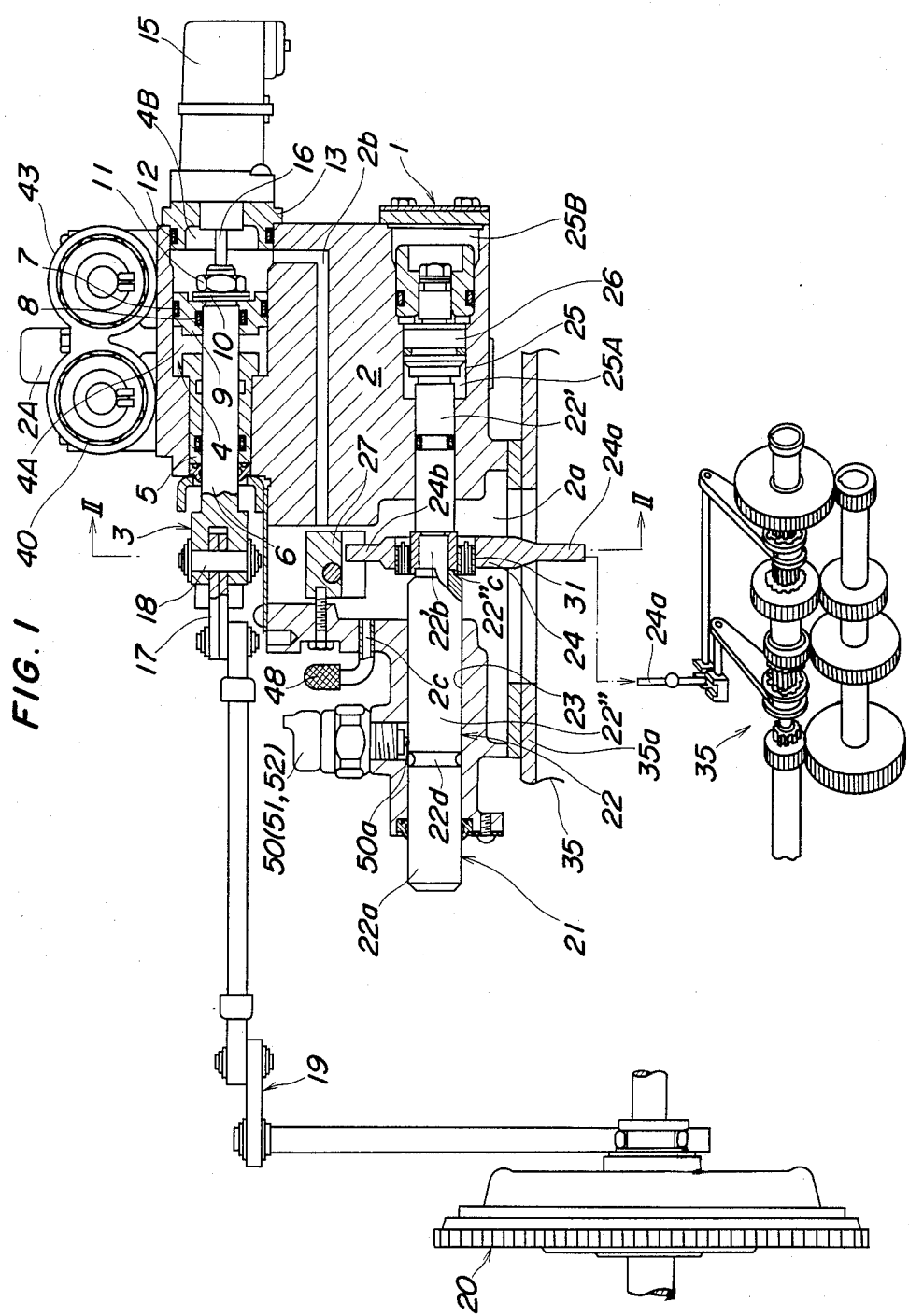
FIG. 1 is a longitudinal sectional view of a hydraulic control unit for automotive vehicles according to an embodiment of the invention.

The invention will now be described in detail with reference to the drawings showing an embodiment thereof.

FIGS. 1 through 4 illustrate a hydraulic control unit according to the invention, in which are incorporated in one body a clutch operating mechanism 3 (second hydraulic actuator means) and a change gear operating mechanism (first hydraulic actuator means) 21. The hydraulic control unit 1 is mounted on top of a speed change gear 35. A clutch cylinder 4 forming part of the clutch operating mechanism 3 is incorporated in a housing 2 of the hydraulic control unit 1. A cylinder barrel 5 is fitted in an open end portion of the clutch cylinder 4, in which is slidably received a shaft 6. At one end of the shaft 6, a piston 9 is received within the clutch cylinder 4 for sliding movement therein relative to the shaft 6. An O-ring 7 is fitted in the outer peripheral surface of the piston 9 in slidable contact with the inner peripheral surface of the cylinder 4, and another O-ring 8 in the inner peripheral surface of the same piston 9 in slidable contact with the outer peripheral surface of the shaft 6, respectively. A washer 10 larger in diameter than the one end of the shaft 6 is fastened to the same end of the shaft 6 by means of a nut 11 screwed thereon so that after the piston 9 rightwardly moves into contact with the washer 10 as viewed in FIG. 1, the shaft 6 is also rightwardly moved together with the piston 9.

The other end portion of the cylinder 4 is closed by a cap 13 fitted therein in airtight manner via an O-ring 12 interposed between the cylinder 4 and the cap 13. Thus, a hydraulic oil chamber 4A and an air chamber 4B are defined within the closed cylinder 4 at opposite sides of the piston 9. The hydraulic oil chamber 4A is connected to solenoid type selector valves (second solenoid valve means) 41-43 (in FIG. 4) mounted on an upper surface of the housing 2, by way of oil passages formed within the housing 2.

Fixed to the cap 13 is a potentiometer 15 (third position sensor means) having a known construction as a clutch position sensor, which has a probe rod 16 projected into the air chamber 4B in axial alignment with the shaft 6. The probe rod 16 is biased in the leftward direction as viewed in FIG. 1 by the force of a spring, not shown, disposed within the potentiometer 15, with its tip kept in urging contact with an opposed end face of the shaft 6. Thus, the probe rod 16 moves in unison with the movement of the shaft 6 so that the potentiometer 15 produces an output voltage corresponding to the axial position of the shaft 6 or that of a clutch lever 17.

The clutch lever 17 is coupled at one end to the other end of the shaft 6 projected outwardly from the housing 2, by means of a pin 18, and at the other end to a clutch 20 through a clutch release means 19.

The change gear operating mechanism 21 has a first shaft 22 fitted through a bore 23 formed in the housing 2 and extends parallel with the shaft 6. The select shaft is slidably movable along its axis and also rotatable about its own axis. The select shaft 22 further extends through an internal lever chamber 2a formed within the housing 2 and communicating with the interior housing 35a of the speed change gear 35. In the internal lever chamber 2a, an internal lever 24 has an intermediate portion which is rotatably fitted on the select shaft 22 at a central location of the chamber, of which one end 24a is projected toward the speed change gear 35 (in the downward direction as viewed in FIG. 1) in engagement with a change gear mechanism 37 thereof through a lever 36 as shown in FIG. 2.

One end 22a of the select shaft 22 is projected outwardly from the housing 2 and adapted to be coupled with a manually operating speed change lever, not shown. This speed change lever is coupled to the select shaft 22 when it is desired to manually operate the speed change gear.

Figure 5:
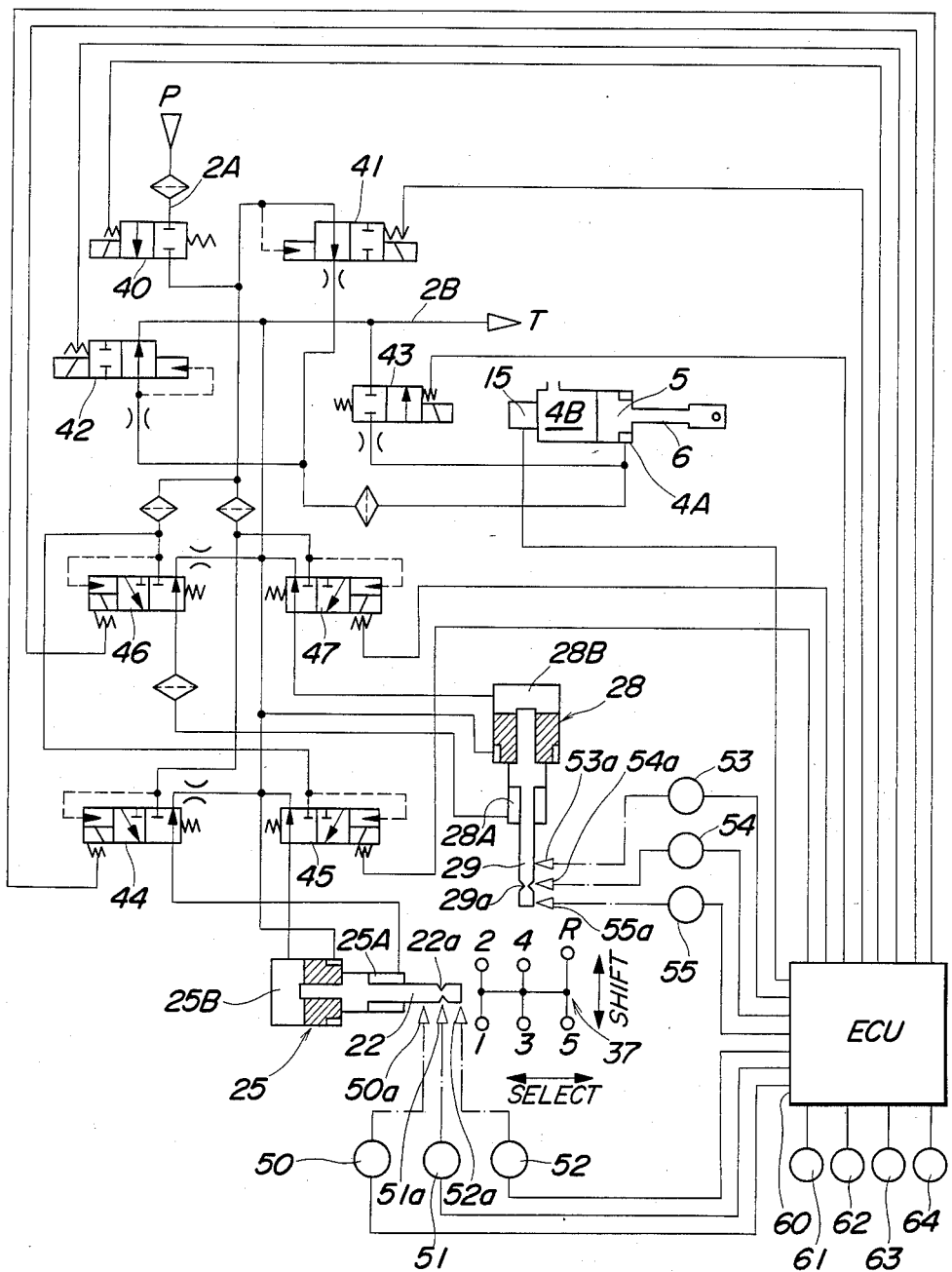
FIG. 5 is a diagram of an oil hydraulic circuit and an electrical circuit employed in the hydraulic control unit of FIG. 1.

A select piston 26 is secured to the other end of the shaft 22 and fitted within a cylinder 25 formed in the housing 2, to define a first hydraulic driving means having hydraulic oil chambers 25A and 25B within the cylinder 25 at its opposite sides. As shown in FIG. 5, these hydraulic oil chambers 25A, 25B are connected, respectively, to solenoid type selector valves 44 and 45 (in FIG. 3) mounted on an upper surface of the housing 2, by way of oil passages formed within the housing 2, to be selectively supplied with hydraulic operating oil for gear selecting operation of the select shaft 22.

Figure 2:
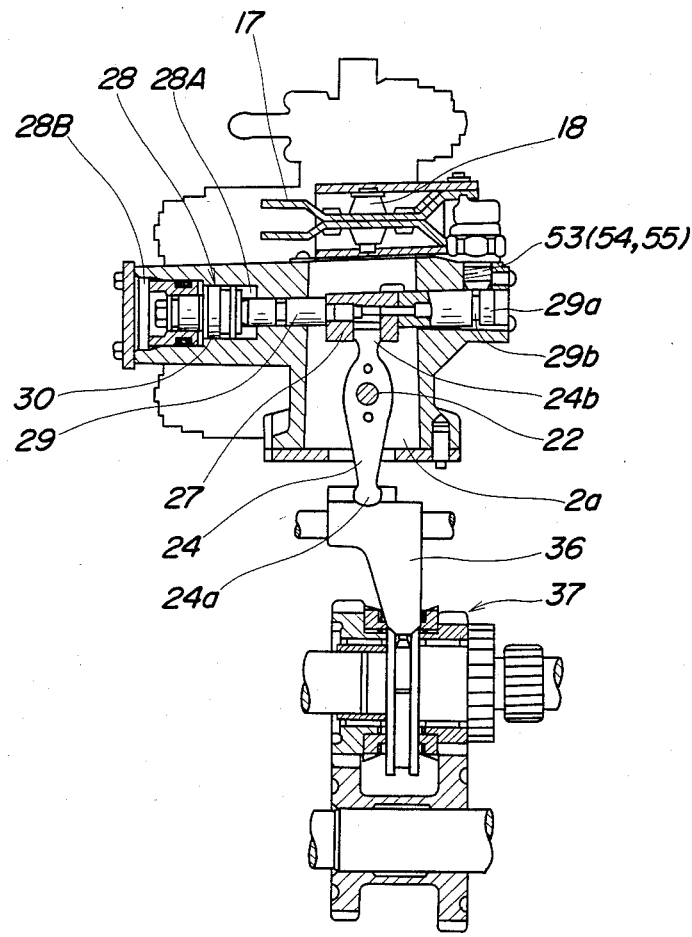
FIG. 2 is a sectional view taken along line II—II in FIG. 1.

As shown in FIG. 2, the other end 24b of the internal lever 24 is coupled to a second shaft 29 of a shift cylinder 28 disposed at right angles to the select shaft 22, by means of a driving block 27 so that the internal lever 24 is rotated by the shift cylinder 28 for gear shifting operation. Cylinder 28 defines a second hydraulic driving means having oil chambers 28A, 28B within cylinder 28 at its opposite sides.

Figure 3:
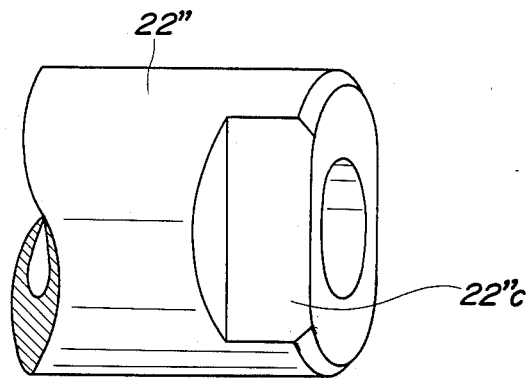
FIG. 3 is an enlarged perspective view of essential part of a select shaft appearing in FIG. 1.

The internal lever 24 is fitted on a reduced-diameter portion 22'b of a shaft 22' disposed at the other end of the select shaft 22. Two pins 31 are axially planted in the internal lever 24 and projected from an axial end face of the lever 24 in a manner axially overlapping with an axial surface of a notch 22"c formed in another shaft 22" as shown in FIG. 3 with a slight gap therebetween, so that when the select shaft 22 is rotated about its own axis through an angle larger than a predetermined angle by manually operating the manual speed change lever coupled to the one end 22a of the select shaft 22, the pins 31 are pressed against the axial surface of the notch 22"c to cause rotation of the internal lever 24 about the shaft 22'.

As shown in FIGS. 1 and 5, selected gear position sensor elements 50-52 are arranged around the end portion 22a of the select shaft 22 (the shaft 22") at circumferentially and axially different locations so as to sense the axial position of an annular groove 22d formed in the outer peripheral surface of the shaft 22" at a predetermined axial location, and the sensor generates an output signal indicative of the sensed position of the select shaft 22, that is, a selected gear position of the speed change gear 35. The sensor elements 50-52 (first position sensor means) are formed of on-off switches having a conventional construction, which are each turned on when tip of the probe 50a-52a stretches into the annular groove 22d in the select shaft 22, and turned off when the probe is retracted by contact with a land of the select shaft 22 adjacent the annular groove 22d.

Shifted gear position sensor elements 53-55 (second position sensor means), as shown in FIGS. 2 and 5, are arranged around an end portion 29a of the shaft 29 at circumferentially and axially different locations to sense the axial position of an annular groove 29b formed in the outer peripheral surface of the shaft 29 at a predetermined axial location, and the sensor generates an output signal indicative of the sensed position of the shaft 29, that is, a shifted gear position of the speed change gear 35. The sensor elements 53-55 are formed of on-off switches having a conventional construction, which are each turned on when tip of the probe 53a-55a stretches into the annular groove 29b in the shift shaft 29, and turned off when the probe is retracted by contact with a land of the shift shaft 29 adjacent the annular groove 29b.

A passage 2b is formed in the housing 2 as shown in FIG. 1, which extends horizontally in the housing 2 along its majority part at a location below the clutch cylinder 4, of which one end is upwardly directed to open in the bottom surface or lower peripheral surface of the air chamber 4B of the clutch cylinder 4, and the other end opens in the internal lever chamber 2a. An air breather 48 is fitted through an end of a passage 2c formed through a side wall of the housing 2 defining the internal lever chamber 2a, to communicate the internal lever chamber 2a with the atmosphere through the passage 2c and the air breather 48. Thus, the air chamber 4B of the clutch cylinder 4 communicates with the atmosphere through the passage 2b, the internal lever chamber 2a, the passage 2c, and the air breather 48. In this manner, according to the invention, by communicating the air chamber 4B with the internal lever chamber 2a through the passage 2b formed in the housing 2, the air breather 48 provided on the side of the speed change gear 35 can also serve as an air breather for the air chamber 4B.

Figure 4:
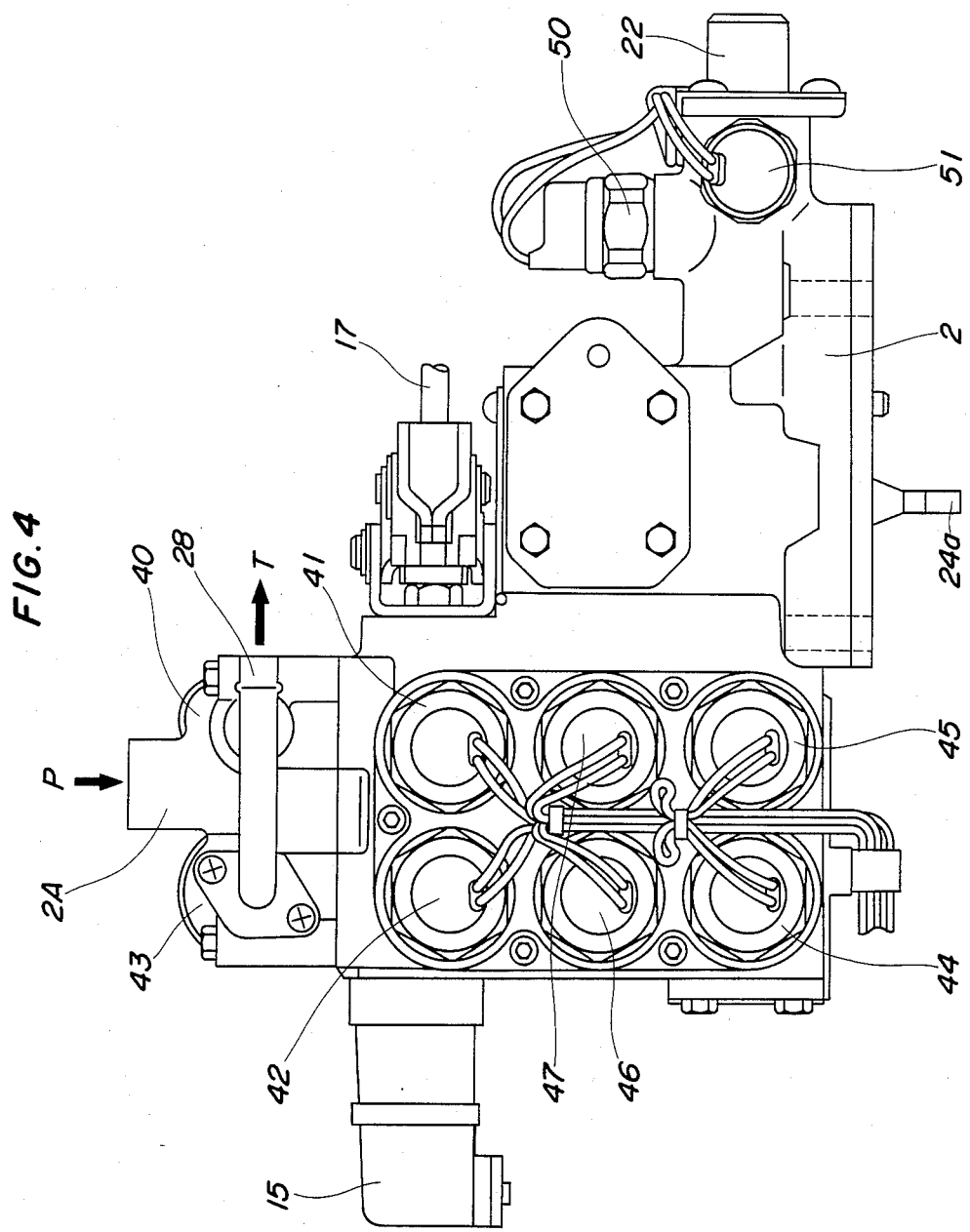
FIG. 4 is a rear view of the hydraulic control unit of FIG. 1.

The oil hydraulic circuit and electrical circuit of the hydraulic control unit 1 are shown in FIG. 5. The hydraulic oil chamber 4A of the clutch cylinder 4 is connected to the solenoid valve 40 through the solenoid valve 41, and also to a passage 2B leading to an oil tank T selectively through the solenoid valve 42 or 43. The hydraulic oil chambers 28A, 28B of the gear shifting cylinder 28 are each connected selectively to the solenoid valve 40 or to the passage 2B through a respective solenoid valve 46, 47. The hydraulic oil chambers 25A, 25B of the gear selecting cylinder 25 are each connected selectively to the solenoid valve 40 or to the passage 2B through the respective solenoid valve 44, 45. Solenoid valves 44, 45, 46 and 47 together comprise a first solenoid valve means for controlling the change gear operating mechanism 21 (first hydraulic actuator means). The solenoid valve 40 is connected to an oil hydraulic pump P through a passage 2A formed in the housing 2 as shown in FIG. 4. The passage 2B is formed in the housing 2.

The clutch position sensor 15, the selected gear position sensor elements 50-52, and the shifted gear position sensor elements 53-55 are electrically connected to an electronic control unit (hereinafter called "the ECU") 60 to supply same with respective output signals. Further electrically connected to the ECU 60 are various sensors for sensing operating conditions of the engine, for instance, an engine rotational speed sensor 61, a rotational speed sensor 62 for sensing the rotational speed of the input shaft of the speed change gear, an accelerator pedal position sensor 63, and an engine cooling water temperature sensor 64. The ECU 60 operates on output signals from the above sensors to control the operations of the aforesaid solenoid valves 40-47 for control of the clutch operating mechanism 3 and the change gear operating mechanism 21.

When the hydraulic oil chamber 4A of the clutch cylinder 4 is supplied with hydraulic operating oil, the piston 9 and the shaft 6 are moved rightward in FIG. 1 to displace the clutch lever 17 in the direction of disengaging the clutch 20. As the oil pressure within the hydraulic oil chamber 4A lowers, the shaft 6 is urgedly returned leftward in FIG. 1 by the force of the clutch spring of the clutch 20 to engage the clutch. On the other hand, when the hydraulic oil chamber 25B of the select cylinder 25 is supplied with hydraulic operating oil, the select shaft 22 is moved leftward in FIG. 1, whereas when the hydraulic oil chamber 25A is supplied with hydraulic operating oil, the select shaft 22 is moved rightward in FIG. 1, so that the internal lever 24 is axially moved together with the shaft 22 to cause gear selection of the change gear mechanism 37 in FIG. 5. That is, in the example of FIG. 5, a pair of 1 and 2 gears, a pair of 3 and 4 gears, or a pair of 5 and R gears is selectively established. When the hydraulic oil chamber 28A of the shift cylinder 28 is supplied with hydraulic operating oil, the shift shaft 29 is moved leftward in FIG. 2, whereas when the hydraulic oil chamber 28B is supplied with hydraulic operating oil, the shaft 29 is moved rightward in FIG. 2, so that the internal lever 24 is rotated about the shaft 22 clockwise or counterclockwise in FIG. 2 to cause gear shifting of the change gear mechanism 37. These gear shifting and selecting operations are carried out in synchronism with the engaging and disengaging operation of the clutch 20.

As stated above, according to the hydraulic control unit of the invention, the hydraulic actuators for gear selecting and shifting operations of the speed change gear, the hydraulic actuator for engaging and disengaging operations of the clutch, the solenoid valves for driving these actuators, the position sensors for sensing the positions of the actuators, etc. are incorporated in the single housing 2 to provide a single-body hydraulic control unit, which makes it possible to minimize the number of connection pipes to be used in the oil hydraulic circuit, thus avoiding the complication of the piping, design the control unit compact in size, and improve the operational stability and efficiency of assemblage of the control unit.

Further, hydraulic operating oil, which leaks from the hydraulic oil chamber 4A of the clutch cylinder 4 to the air chamber 4B thereof as the clutch operating mechanism 3 operates, can drain through the passage 2b formed in the housing 2 into the interior of the speed change gear 35 via the internal lever chamber 2a, without staying in the air chamber 4B, thus avoiding degradation of the performance of the potentiometer 21 as well as malfunction of the hydraulic actuator 3 for the clutch, particularly, the piston 9, which would be otherwise caused by the leakage of oil. Moreover, by virtue of the use of the single air breather 48 for both the speed change gear 35 and the air chamber 4B, the intrusion of water, dust, etc. into the air chamber 4B from outside can be prevented. In addition, since the air within the air chamber 4B is discharged into the atmosphere through the passage 2b, the internal lever chamber 2a, and the air breather 48 as the piston 9 moves rightward in FIG. 1 on the compression stroke, another problem is overcome. The conventional phenomenon, which can occur if the air chamber 4B is directly provided with an exclusive air breather, of oil leaking into the air chamber 4B which is then blown out of the hydraulic control unit 1 during the compression stroke of the piston is prevented.

While a preferred embodiment of the invention has been described, variations thereto will occur to those skilled in the art within the scope of the present inventive concepts which are delineated by the following claims.

What is claimed is:

1. In a hydraulic control unit for use in an automotive transmission having a speed change gear and a clutch, said hydraulic control unit including a housing, a change gear operating mechanism means for hydraulically operating said speed change gear, and a clutch operating mechanism means for hydraulically operating said clutch, wherein said change gear operating mechanism means and said clutch operating mechanism means are both incorporated in said housing, the improvement wherein said change gear operating mechanism means comprises a first hydraulic actuator means for effecting gear shifting of said speed change gear and gear selection thereof, first solenoid valve means for controlling said first hydraulic actuator means, first and second position sensor means for sensing positions of said first hydraulic actuator means indicative of a selected gear position of said speed change gear and a shifted gear position thereof, respectively, and said clutch operating mechanism means comprises a second hydraulic actuator means for effecting engagement and disengagement of said clutch, second solenoid valve means for controlling said second hydraulic actuator means, and a third position sensor means for sensing a position of said second hydraulic actuator means indicative of engagement and disengagement of said clutch, said first and second hydraulic actuator means, said first and second solenoid valve means, and said first, second and third position sensor means being all incorporated in one body in said housing.

2. A hydraulic control unit as claimed in claim 1, wherein said second hydraulic actuator means comprises a shaft drivingly connected to said clutch of said transmission, a piston means for driving said shaft, a cylinder formed within said housing and accommodating said piston means for sliding movement therein, said piston means cooperating with said cylinder to define a hydraulic oil chamber at one side thereof and an air chamber communicating with the atmosphere, at the opposite side thereof.

3. A hydraulic control unit as claimed in claim 2, including an air breather provided on said housing, and a passage formed within said housing and communicating said air breather with said air chamber of said second hydraulic actuator means.

4. A hydraulic control unit as claimed in claim 3, wherein said passage has one end thereof opening in a bottom surface of said air chamber of said second hydraulic actuator means and extends in said housing at a level lower than said air chamber.

5. A hydraulic control unit as claimed in claim 3, including a first chamber formed in said housing and accommodating at least part of said first hydraulic actuator means, said passage having one end thereof opening in said first chamber, said air breather having one end thereof opening in said first chamber and another end thereof disposed outside said housing.

6. A hydraulic control unit as claimed in claim 1, wherein said first hydraulic actuator means comprises a first shaft fitted in said housing and movable along and rotatable about an axis thereof, first hydraulic driving means mounted in said housing and engaging with one end of said first shaft for driving said first shaft along the axis thereof, and a lever having an intermediate portion thereof fitted on said first shaft for axial movement and rotation about said first shaft together therewith, a second shaft fitted in said housing and movable along an axis thereof, said second shaft extending at right angles to said first shaft, and second hydraulic driving means mounted in said housing and engaging with one end of said second shaft for driving said second shaft along the axis thereof, said lever having one end thereof engaging with said second shaft for movement along the axis of said second shaft together therewith, and another end thereof engaging with said speed change gear whereby movement of said first shaft along the axis thereof causes gear selection of said speed change gear through said lever, while rotation of said first shaft about the axis thereof or movement of said second shaft along the axis thereof causes gear shifting of said speed change gear through said lever.

7. A hydraulic control unit as claimed in claim 6, wherein said first position sensor means comprises an annular groove formed in an outer peripheral surface of said first shaft at a predetermined axial location, a plurality of switches arranged at axially different locations on said first shaft, said switches each having a probe engageable in or disengageable from said annular groove as said first shaft axially moves to cause switching of said switches.

8. A hydraulic control unit as claimed in claim 6, wherein said second position sensor means comprises an annular groove formed in an outer peripheral surface of said second shaft at a predetermined axial location, a plurality of switches arranged at axially different locations on said second shaft, said switches each having a probe engageable in or disengageable from said annular groove as said second shaft axially moves to cause switching of said switches.

* * * * *